United States Patent
Chu et al.

(10) Patent No.: US 10,562,820 B2
(45) Date of Patent: Feb. 18, 2020

(54) LOW-TEMPERATURE CO-FIRED MICROWAVE DIELECTRIC CERAMIC MATERIAL, AND PREPARATION METHOD AND APPLICATION THEREOF

(71) Applicant: WALSIN TECHNOLOGY CORPORATION, Taipei (TW)

(72) Inventors: Li-Wen Chu, Taipei (TW); Kuei-Chih Feng, Taoyuan (TW); Chih-Hao Liang, Changhua County (TW)

(73) Assignee: WALSIN TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 16/158,275

(22) Filed: Oct. 11, 2018

(65) Prior Publication Data
US 2019/0039957 A1    Feb. 7, 2019

Related U.S. Application Data

(63) Continuation-in-part of application No. 15/597,011, filed on May 16, 2017, now abandoned.

(30) Foreign Application Priority Data

May 17, 2016    (TW) .............................. 105115195 A (51) Int. Cl.
*C04B 35/20*    (2006.01)
*C04B 35/22*    (2006.01)
(Continued)

(52) U.S. Cl.
CPC .............. *C04B 35/49* (2013.01); *C03C 3/089* (2013.01); *C03C 8/02* (2013.01); *C04B 35/20* (2013.01); *C04B 35/22* (2013.01); *C04B 35/62685* (2013.01); *C04B 35/64* (2013.01); *H01G 4/1227* (2013.01); *H01G 4/1236* (2013.01);
(Continued)

(58) Field of Classification Search
CPC ......... C04B 35/20; C04B 35/22; C04B 35/49; C04B 35/465
See application file for complete search history.

(56) References Cited

U.S. PATENT DOCUMENTS 5,065,275 A  *  11/1991  Fujisaki .................. B32B 18/00
                                                         174/250
7,351,674 B2 *  4/2008  Mori ....................... C03C 3/066
                                                         428/210
(Continued)

*Primary Examiner* — Karl E Group
(74) *Attorney, Agent, or Firm* — Chun-Ming Shih (57) ABSTRACT

A low-temperature co-fired microwave dielectric ceramic material includes: (a) 85 wt % to 99 wt % ceramic material comprising $Mg_2SiO_4$, $Ca_2SiO_4$, $CaTiO_3$, and $CaZrO_3$, wherein a weight ratio of $Mg_2SiO_4$ relative to $Ca_2SiO_4$ is of $(1-x):x$, a weight ratio of $CaTiO_3$ relative to $CaZrO_3$ is of $y:z$, and a weight ratio of entities of $Mg_2SiO_4$ and $Ca_2SiO_4$ relative to $CaTiO_3$ is of $(1-y-z):y$, $0.2 \leq x \leq 0.7$, $0.05 \leq y \leq 0.2$, $0.05 \leq z \leq 0.4$; and (b) 1 wt % to 15 wt % glass material composed of $Li_2O$, $BaO$, $SrO$, $CaO$, $B_2O_3$, and $SiO_2$.

6 Claims, 4 Drawing Sheets

Wet-mixing the ceramic precursor material with the glass precursor material at room temperature, wherein the ceramic precursor material is composed of an eutectic phase composite and an additive, the eutectic phase composite is composed of a $Mg_2SiO_4$ powder and a $Ca_2SiO_4$ powder, the additive is composed of a $CaZrO_3$ powder and a $CaTiO_3$ powder  — S01

Sintering the mixed materials at a temperature of 900-970°C for 0.5-4 hours — S02

(51) Int. Cl.
 C04B 35/49      (2006.01)
 C04B 35/64      (2006.01)
 C04B 35/626     (2006.01)
 H01G 4/12       (2006.01)
 H01G 4/30       (2006.01)
 C03C 8/02       (2006.01)
 C03C 3/089      (2006.01)

(52) U.S. Cl.
 CPC ....... *H01G 4/30* (2013.01); *C04B 2235/3206* (2013.01); *C04B 2235/3208* (2013.01); *C04B 2235/3213* (2013.01); *C04B 2235/3215* (2013.01); *C04B 2235/3236* (2013.01); *C04B 2235/3248* (2013.01); *C04B 2235/3249* (2013.01); *C04B 2235/3409* (2013.01); *C04B 2235/3418* (2013.01); *C04B 2235/3445* (2013.01); *C04B 2235/3454* (2013.01); *C04B 2235/36* (2013.01); *C04B 2235/365* (2013.01); *C04B 2235/77* (2013.01); *H01G 4/1245* (2013.01)

(56) References Cited

U.S. PATENT DOCUMENTS

| | | | |
|---|---|---|---|
| 7,417,001 B2* | 8/2008 | Mori | C03C 3/066 428/210 |
| 7,439,202 B2* | 10/2008 | Mori | C03C 3/066 428/210 |
| 7,781,357 B2* | 8/2010 | Abe | C04B 35/20 501/122 |
| 7,824,642 B2* | 11/2010 | Moriya | B82Y 30/00 174/255 |
| 7,928,030 B2* | 4/2011 | Wang | C04B 35/016 264/666 |

* cited by examiner

Wet-mixing the ceramic precursor material with the glass precursor material at room temperature, wherein the ceramic precursor material is composed of an eutectic phase composite and an additive, the eutectic phase composite is composed of a $Mg_2SiO_4$ powder and a $Ca_2SiO_4$ powder, the additive is composed of a $CaZrO_3$ powder and a $CaTiO_3$ powder ～S01

Sintering the mixed materials at a temperature of 900-970°C for 0.5-4 hours ～S02

FIG. 1

```
┌─────────────────────────────────────────┐
│ Wet-mixing the ceramic precursor material│
│ with the glass precursor material at room│
│ temperature, wherein the ceramic precursor│
│ material is composed of an eutectic phase│    S11
│ composite and an additive, the eutectic phase│
│ composite is composed of a Mg₂SiO₄ powder│
│ and a Ca₂SiO₄ powder, the additive is   │
│ composed of a CaZrO₃ powder and a CaTiO₃│
│                 powder                  │
└─────────────────────────────────────────┘
                     │
                     ▼
┌─────────────────────────────────────────┐
│ Sintering the mixed materials with an Ag or Cu│   S12
│ electrode at a temperature of 900-970°C for│
│              0.5-4 hours                │
└─────────────────────────────────────────┘
```

LOW-TEMPERATURE CO-FIRED MICROWAVE DIELECTRIC CERAMIC MATERIAL, AND PREPARATION METHOD AND APPLICATION THEREOF

CROSS REFERENCE OF THE INVENTION

The present application is a continuation in part application of U.S. patent application Ser. No. 15/597,011, filed on May 16, 2017; now abandoned the content thereof is incorporated by reference herein.

BACKGROUND OF THE INVENTION

Field of the Invention

The present invention relates to a microwave dielectric material, and its preparation method and application, and more particularly, to producing a microwave dielectric material prepared through the technique of low-temperature co-fired ceramic.

Description of the Prior Art

Current communication industry development requires multi-functionalities and miniaturization of the wireless communication devices. Modularization of the radio frequency (RF) circuit has become key to development in the industry. In such development, resistance-capacitance delay (RC delay) has become more intensive due to the shrinking distance between the transmission lines of microwave device, resulting in an increase of interference and power consumption when an electronic signal is transferring among metals. Moreover, the low-temperature, co-fired ceramic material and process technology thereof is widely used in applications of microwave devices and is a key technique that has become the focus of the industrial field in developing communications components such as, for example: filters, couplers, antennae etc. To solve the problem of RC delay and provide the properties of co-firing ceramics at low temperatures, the present invention discloses a material with low dielectric constant which can co-fire with low-melting-point metal electrodes, such as Ag or Cu, etc. at a low temperature. With the increasing demand for communication industry, the annual global market growth rate of the microwave ceramic material applied in the microwave ceramic capacitor has been about 15%.

Conventional materials of low dielectric constant include silicate (such as $Sr_2SiO_4$, $Ba_2SiO_4$, $Mn_2SiO_4$), molybdate ($SrMoO_4$, $BaMoO_4$) and tungstate ($BaWO_4$, $MgWO_4$), which all have a low microwave dielectric constant and efficacious properties; however, the material of molybdate and tungstate are expensive. This silicate is most widely applied in this field due to its low dielectric constant and low material cost. $Mg_2SiO_4$ has a low dielectric constant and high quality factor of 240000 GHz; however, the temperature capacitance coefficient is relatively high up to −70 (ppm/° C.).

The prior art, CN 1315134, discloses a material system of $Mg_2SiO_4$ and $MgTiO_3$ that can reduce the temperature capacitance coefficient effectively; however, its sintering temperature is higher than 1300° C., making it impossible to be employed in the low-temperature co-fired process. Furthermore, literature in the prior art including CN 101429015A has reported that $Ca_2SiO_4$ has a high quality factor and low dielectric constant (8.6), but it belongs to a high-temperature sintering material (>1200° C.). The prior art also discloses a $Mg_2SiO_4$ having a low dielectric constant of 6 to 8, dielectric loss value less than $10^{-5}$ and the Qf value up to 160000 GHz. Such materials can be applied in electronic circuit substrate, filter, microwave substrate high frequency communication, but it has a high sintering temperature of 1300-1500° C. Consequently, this sintering temperature is still too high for it to be co-fired with Cu and Ag electrode.

The prior art also discloses a Li contained compound oxide ceramic $Li_2Ba_3TiO_6$ having a dielectric constant of 28-28.7, a quality factor of 54000-79000 GHz, a temperature coefficient of about −7 ppm/° C. This compound has a sintering temperature ranging from 1000 to 1040° C., which is though lower than 300° C. sintering temperature of $Mg_2SiO_4$. The sintering temperature is still too high to be co-fired with Cu, Ag etc. because of high sintering temperature restricting its industrial application.

The normal method for decreasing ceramic sintering temperature typically comprises: adding the oxide or glass material with low melting point such as $B_2O_3$ or $V_2O_5$ etc. to produce a molten liquid phase at low temperature. The oxide or glass with low melting point benefit to sintering reaction of the ceramic material, leading to a decrease in original sintering temperature. However, though using above manner can decrease original sintering temperature of ceramic material, the property of original material will be effected or the follow-up processing will meet difficulty due to different properties (such as high frequency dielectric property) between the adding material and the original material.

In addition to decreasing the sintering temperature, the glass material is processed into a slurry with the microwave dielectric material to derive a high frequency multilayer capacitor device, in which PVA or PVB is always utilized by the slurry system as a binder, and according to the research report in prior art [J. Am. Ceram. Soc., 93 3049-3051 (2010)] that there may be a cross-linking reaction between PVA or PVB and the flux $B_2O_3$ forming a three-dimensional (3-D) network gel structure such that the viscosity of the slurry is significantly increased; therefore, it is harmful to the coating process and cannot be applied to make a multilayer ceramic capacitor device. Unfortunately, however, the need persists for a material design employing a low temperature sintering process while also maintaining efficacious processing and electrical properties of ceramic material.

SUMMARY OF THE INVENTION

To solve above technical disadvantages of conventional materials, the present invention is directed to providing a low-temperature co-fired microwave dielectric ceramic material and the preparation method thereof, i.e. sintering into dense structure at a temperature of 900-970° C. and co-firing with Ag in ambient environment and with Cu in inert atmosphere; a microwave dielectric ceramic material having advantageous properties including low dielectric constant (8-15), high quality factor (Q factor), low capacitance-temperature coefficient for applications to such microwave dielectric devices as capacitor, ceramic filter, ceramic antenna etc.

To further address technical problems of conventional materials, a yet further purpose of the present invention is to provide co-firing at low temperature by adding an eutectic composition and developing a new glass material formulation. For ceramic powder comprising 30 wt %-80 wt % $Mg_2SiO_4$ and 20 wt %-70 wt % $Ca_2SiO_4$, there could be an eutectic composition. Thus, instead of sintering at 1300° C. into density originally, the ceramic material with eutectic composition is sintered into dense structure only at 1150° C. Both $Mg_2SiO_4$ and $Ca_2SiO_4$ are microwave dielectric ceramics having a low dielectric constant, their eutectic phase material has the property of low dielectric constant and high quality factor. To further adjust the dielectric property of this material formulation, additives $CaTiO_3$ and $CaZrO_3$ are mixed into the formulation. Next, the above ceramic material is combined into a glass slurry to compose a ceramic composite at a low sintering temperature ($\leq 1000°$ C.) by liquid phase sintering of glass material.

To solve a yet further technical problem of conventional materials, another purpose of the present invention is to further provide a ceramic composite with the low temperature sintering by the property of liquid phase sintering of glass material, wherein a glass material comprising $Li_2O$, $BaO$, $SrO$, $CaO$, $B_2O_3$, and $SiO_2$ has the property of high chemical stability obtained by mixing the powder of $Li_2O$, $BaO$, $SrO$, $CaO$, $B_2O_3$ and $SiO_2$ to melt at 1000-1300° C.; the composed glass material also has high structural stability in addition to provide the effect of sintering into a dense structure at low temperature for the ceramic powder, and may not react with water, methanol, ethanol, PVA and PVB, avoiding gel effect; and having efficacious plating resistance for conveniently applying to the process for multilayer capacitor device.

The present invention provides a low-temperature co-fired microwave dielectric ceramic material, which comprises: (a) 85 wt % to 99 wt % ceramic material, which mainly comprises $Mg_2SiO_4$, $Ca_2SiO_4$, $CaTiO_3$, and $CaZrO_3$, wherein a weight ratio of $Mg_2SiO_4$ relative to $Ca_2SiO_4$ is of $(1-x):x$, a weight ratio of $CaTiO_3$ relative to $CaZrO_3$ is of $y:z$, and a weight ratio of entities of $Mg_2SiO_4$ and $Ca_2SiO_4$ relative to $CaTiO_3$ is of $(1-y-z):y$, $0.2 \leq x \leq 0.7$, $0.05 \leq y \leq 0.2$, $0.05 \leq z \leq 0.4$; and (b) 1 wt % to 15 wt % glass material mainly composed of $Li_2O$, $BaO$, $SrO$, $CaO$, $B_2O_3$, and $SiO_2$.

Preferably, $Li_2O$ accounts for a wt % (0 wt %$\leq$a wt %$\leq$10 wt %) by weight of the glass material; BaO accounts for b wt % (1 wt %$\leq$b wt %$\leq$15 wt %) by weight of the glass material; SrO accounts for c wt % (1 wt %$\leq$c wt %$\leq$11 wt %) by weight of the glass material; CaO accounts for d wt % (5 wt %$\leq$d wt %$\leq$23 wt %) by weight of the glass material; $B_2O_3$ accounts for e wt % (5 wt %$\leq$e wt %$\leq$30 wt %) by weight of the glass material; $SiO_2$ accounts for f wt % (20 wt %$\leq$f wt %$\leq$50 wt %) by weight of the glass material; and a wt %+b wt %+c wt %+d wt %+e wt %+f wt %=100 wt %.

Preferably, the dielectric constant of the low-temperature co-fired microwave dielectric ceramic material ranges from 8 to 15, the sintering density distribution is of 3.17-3.52 (g/cm³), the quality factor distribution is of 2900-6500, and the insulation resistance property is of $\geq 3.5 \times 10^{12} \Omega$.

The present invention provides a preparation method for the low-temperature co-fired microwave dielectric ceramic material, which comprises: (a) mixing ceramic precursor material of the ceramic material with glass precursor material of the glass material at room temperature, wherein the ceramic precursor material is composed of an eutectic phase composite of a $Mg_2SiO_4$ powder and a $Ca_2SiO_4$ powder with then addition of additives of a $Mg_2SiO_4$ powder and $Ca_2SiO_4$ powder; (b) sintering the mixed material at a low temperature of 900-970° C. for 0.5-4 hours.

Preferably, the $Mg_2SiO_4$ powder is obtained by calcining MgO and $SiO_2$ at 900-1300° C. for 4-10 hours and then grinding for refinement.

Preferably, the $Ca_2SiO_4$ powder is obtained by calcining CaO and $SiO_2$ at 900-1200° C. for 4-10 hours and then grinding for refinement.

Preferably, the $CaTiO_3$ powder is obtained by calcining CaO and $TiO_2$ at 900-1200° C. for 4-10 hours and then grinding for refinement.

Preferably, the $CaZrO_3$ powder is obtained by calcining CaO and $ZrO_2$ at 900-1200° C. for 4-10 hours and then grinding for refinement.

Preferably, the glass precursor material is composed of 0-10 wt % $Li_2O$ powder, 1-15 wt % BaO powder, 1-11 wt % SrO powder, 5-23 wt % CaO powder, 5-30 wt % $B_2O_3$ powder and 20-50 wt % $SiO_2$ powder, forming the glass material after the glass precursor material being melted at 1000-1300° C. for 2-10 hours and then being ground for refinement.

The present invention provides another preparation method for low-temperature co-fired microwave dielectric ceramic material, which comprises: (a) mixing ceramic precursor material of the ceramic material with glass precursor material of the glass material at room temperature, wherein the ceramic precursor material is composed of an eutectic phase composite composed by a $Mg_2SiO_4$ powder and $Ca_2SiO_4$ powder with addition of additives of a $CaZrO_3$ powder and $CaTiO_3$ powder; and (b) sintering the mixed material with Ag or Cu electrode at a low temperature of 900-970° C. for 0.5-4 hours.

Preferably, the $Mg_2SiO_4$ powder is obtained by calcining MgO and $SiO_2$ at 900-1300° C. for 4-10 hours and then grinding for refinement.

Preferably, the $Ca_2SiO_4$ powder is obtained by calcining CaO and $SiO_2$ at 900-1200° C. for 4-10 hours and then grinding for refinement.

Preferably, the $CaTiO_3$ powder is obtained by calcining CaO and $TiO_2$ at 900-1200° C. for 4-10 hours and then grinding for refinement.

Preferably, the $CaZrO_3$ powder is obtained by calcining CaO and $ZrO_2$ at 900-1200° C. for 4-10 hours and then grinding for refinement.

Preferably, the glass precursor material is composed of 0-10 wt % $Li_2O$ powder, 1-15 wt % BaO powder, 1-11 wt % SrO powder, 5-23 wt % CaO powder, 5-30 wt % $B_2O_3$ powder and 20-50 wt % $SiO_2$ powder, forming the glass material after the glass precursor material being melted at 1000-1300° C. for 2-10 hours and then being ground for refinement.

The present invention provides a high frequency ceramic capacitor, which comprises: (a) a dielectric layer, which is mainly composed of the low-temperature co-fired microwave dielectric ceramic material; (b) an internal electrode, which is mounted on a surface of the dielectric layer; and (c) two terminal electrodes, which are respectively mounted at two sides of the dielectric layer.

Preferably, the internal electrode is made of silver, palladium, nickel, or copper.

Preferably, the terminal electrode is made of silver, nickel, copper, or tin.

Preferably, each terminal electrode comprises: (c1) a substrate layer, which is mounted at one side of the dielectric layer; (c2) a barrier layer, which is mounted on the substrate layer; and (c3) a soldering layer, which is mounted on the barrier layer.

DETAILED DESCRIPTION OF THE PREFERRED EMBODIMENTS

The specific embodiments will be described as follows to illustrate the implementing aspects of the present invention, but not limit the scope intended to be protected by the present invention.

The first embodiment of the present invention provides a low-temperature co-fired microwave dielectric ceramic material comprising: 85 wt % to 99 wt % ceramic material and 1 wt % to 15 wt % glass material. The dielectric constant of the above microwave dielectric ceramic material is of a low dielectric constant ranging from 8 to 15, and while having a microwave dielectric material with high quality factor and temperature frequency coefficient close to zero, the sintering density distribution thereof being 3.17-3.52 (g/cm$^3$), the quality factor distribution being of 2900-6500, and the insulation resistance property being of $\geq 3.5 \times 10^{12} \Omega$.

The ceramic material mainly comprises $Mg_2SiO_4$, $Ca_2SiO_4$, $CaTiO_3$, and $CaZrO_3$. Through prior researching, for ceramic powder comprising $Mg_2SiO_4$ and $Ca_2SiO_4$, if a weight ratio of $Mg_2SiO_4$ relative to $Ca_2SiO_4$ is of (1−x):x, $0.2 \geq x \geq 0.7$, there could be an eutectic composition. The temperature for sintering the ceramic into dense structure may be decreased from original 1300° C. to 1150° C. At the same time, this eutectic phase material also has a property of low dielectric constant and high quality factor. Appropriate $CaTiO_3$ and $CaZrO_3$ are added for further adjustment of overall dielectric properties of the material after sintering, the ceramic material in the first embodiment of the present invention is then obtained, wherein a weight ratio of $Mg_2SiO_4$ relative to $Ca_2SiO_4$ is of (1−x):x, a weight ratio of $CaTiO_3$ relative to $CaZrO_3$ is of y:z, and a weight ratio of entities of $Mg_2SiO_4$ and $Ca_2SiO_4$ relative to $CaTiO_3$ is of (1−y−z):y, $0.2 \leq x \leq 0.7$, $0.05 \leq y \leq 0.02$, $0.05 \leq z \leq 0.4$.

In the glass material, $Li_2O$ accounts for a wt % (0 wt %$\leq$a wt %$\leq$10 wt %) by weight of the glass material; BaO accounts for b wt % (1 wt %$\leq$b wt %$\leq$15 wt %) by weight of the glass material; SrO accounts for c wt % (1 wt %$\leq$c wt %$\leq$11 wt %) by weight of the glass material; CaO accounts for d wt % (5 wt %$\leq$d wt %$\leq$23 wt %) by weight of the glass material; $B_2O_3$ accounts for e wt % (5 wt %$\leq$e wt %$\leq$30 wt %) by weight of the glass material; $SiO_2$ accounts for f wt % (20 wt %$\leq$f wt %$\leq$50 wt %) by weight of the glass material, and a wt %+b wt %+c wt %+d wt %+e wt %+f wt %=100 wt %.

Figure 1:
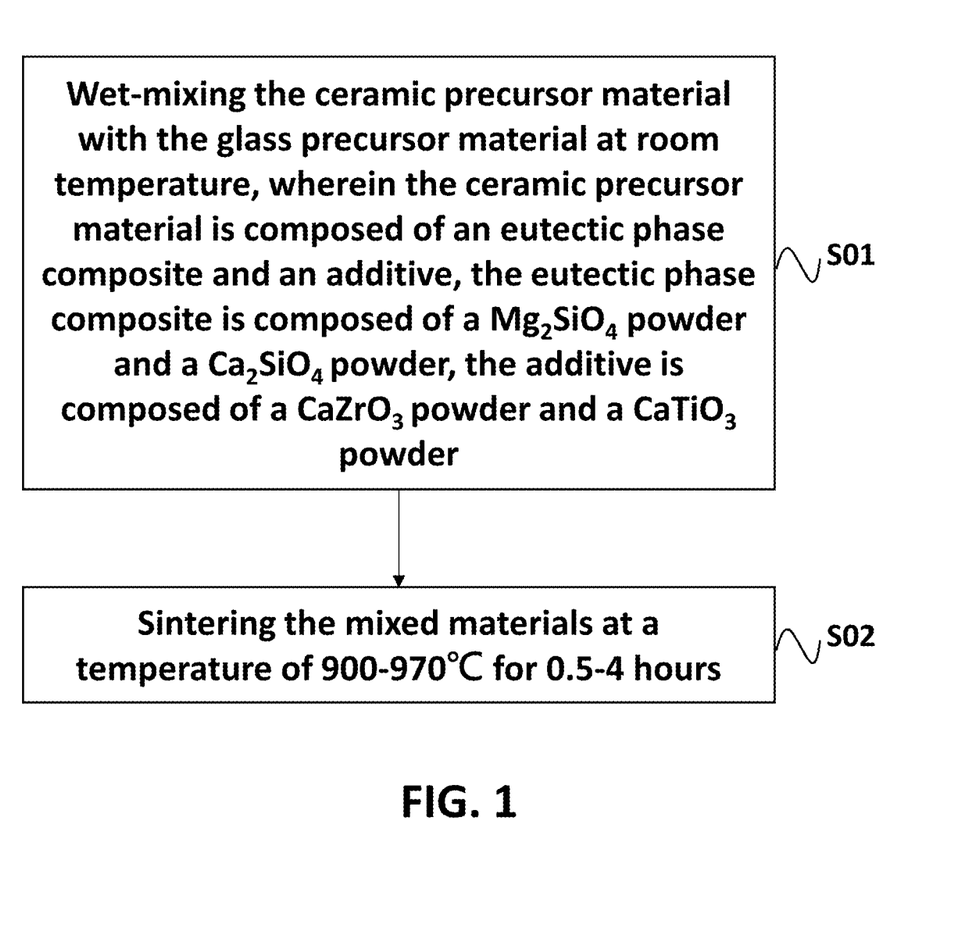
FIG. 1 is a flow chart of low-temperature co-fired microwave dielectric ceramic material and preparation method thereof of the present invention.

With reference to FIG. 1, the second embodiment of the present invention provides a preparation method for low-temperature co-fired microwave dielectric ceramic material comprising:

(S01): wet-mixing ceramic precursor material of the ceramic material with glass precursor material of the glass material at room temperature, wherein the ceramic precursor material is composed of an eutectic phase composite and an additive, in which the eutectic phase composite is composed of a $Mg_2SiO_4$ powder and a $Ca_2SiO_4$ powder, the additive is composed of a $CaZrO_3$ powder and a $CaTiO_3$ powder; and (S02): sintering the mixed material at a temperature of 900-970° C. for 0.5-4 hours.

The ceramic precursor material is composed of $Mg_2SiO_4$ powder, $Ca_2SiO_4$ powder, $CaZrO_3$ powder and $CaTiO_3$ powder. The $Mg_2SiO_4$ powder is prepared by weighing MgO and $SiO_2$ according to stoichiometric ratio thereof and calcining them at 900-1300° C. for 4-10 hours and then grinding the obtained product for refinement. The $Ca_2SiO_4$ powder is prepared by weighing CaO and $SiO_2$ according to stoichiometric ratio thereof and calcining them at 900-1200° C. for 4-10 hours and then grinding the obtained product for refinement. The $CaTiO_3$ powder is prepared by weighing CaO and $TiO_2$ according to stoichiometric ratio thereof and calcining them at 900-1200° C. for 4-10 hours and then grinding the obtained product for refinement. The $CaZrO_3$ powder is prepared by weighing CaO and $ZrO_2$ according to stoichiometric ratio thereof and calcining them at 900-1200° C. for 4-10 hours and then grinding the obtained product for refinement.

The glass precursor material is composed of 0-10 wt % $Li_2O$ powder, 1-10 wt % BaO powder, 1-10 wt % SrO powder, 5-20 wt % CaO powder, 5-30 wt % $B_2O_3$ powder and 10-50 wt % $SiO_2$ powder, forming the glass material of $Li_2O$—BaO—SrO—CaO—$B_2O_3$—$SiO_2$ after the glass precursor material being melted at 1000-1300° C. for 2-10 hours and then ground for refinement. For the property of the glass material, in addition to provide an advantageous liquid sintering property when glass precursor material being co-fired with ceramic precursor material, it also has a high chemical stability: not easily hydrolyzed in water or alcohol etc. and resistant to corrosion in electroplating baths (copper, nickel or tin).

After adding water, alcohol, dispersant etc. for wet-mixing the ceramic precursor material with the glass precursor material for 2 hours, then filtering to dry. Sintering the mixed material at a low temperature of 900-970° C., and may co-fire them with Ag or Cu for 0.5-4 hours, then the dielectric constant of the above microwave dielectric ceramic material becomes a low dielectric constant ranging from 8 to 15, and while becoming a microwave dielectric material with high quality factor and temperature frequency coefficient close to zero, the sintering density distribution thereof is of 3.17-3.52 (g/cm$^3$), the quality factor distribution is of 2900-6500, and the insulation resistance property is of $\geq 3.5 \times 10^{12} \Omega$.

Figure 2:
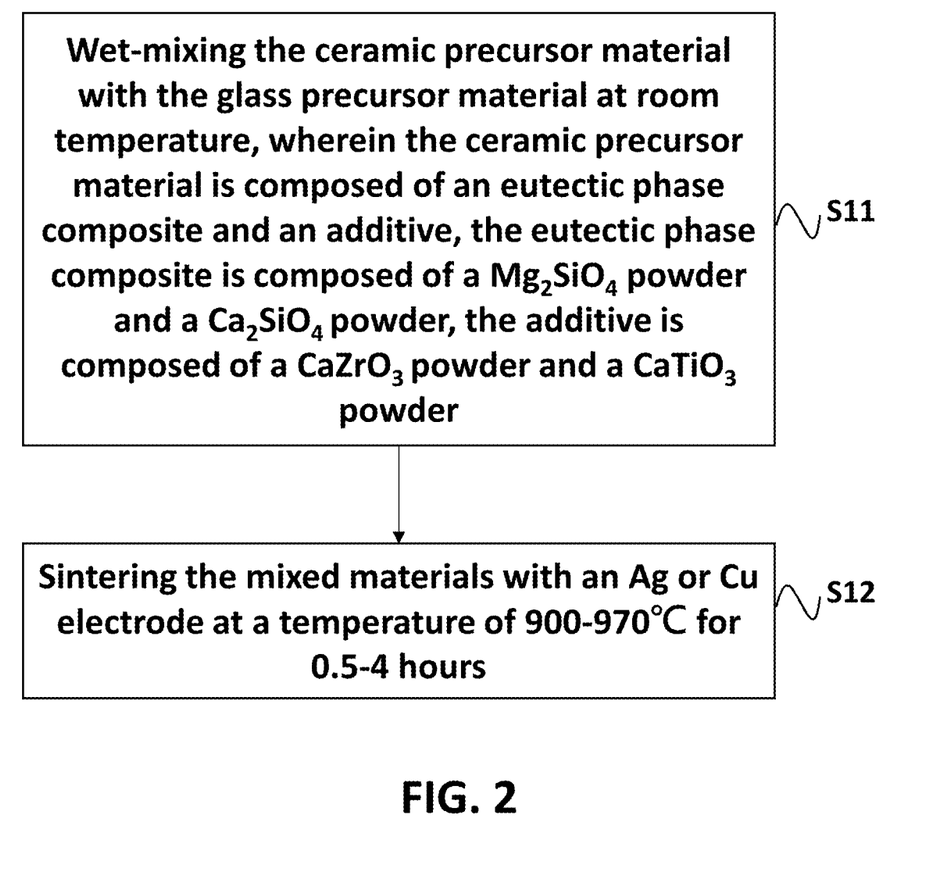
FIG. 2 is another flow chart of low-temperature co-fired microwave dielectric ceramic material and preparation method thereof of the present invention.

With reference to FIG. 2, the third embodiment of the present invention provides another preparation method for low-temperature co-fired microwave dielectric ceramic material comprising:

(S11): wet-mixing ceramic precursor material of the ceramic material with glass precursor material of the glass material of at room temperature, wherein the ceramic precursor material is composed of an eutectic phase composite and an additive, in which the eutectic phase composite is composed of a $Mg_2SiO_4$ powder and a $Ca_2SiO_4$ powder, the additive is composed of a $CaZrO_3$ powder and a $CaTiO_3$ powder; and (S12): sintering the mixed material with an Ag or Cu electrode at a temperature of 900-970° C. for 0.5-4 hours.

The preparation manner for ceramic material and glass material in the third embodiment of the present invention is similar to that in the second embodiment, and will not be described in detail in the present embodiment.

Figure 3:
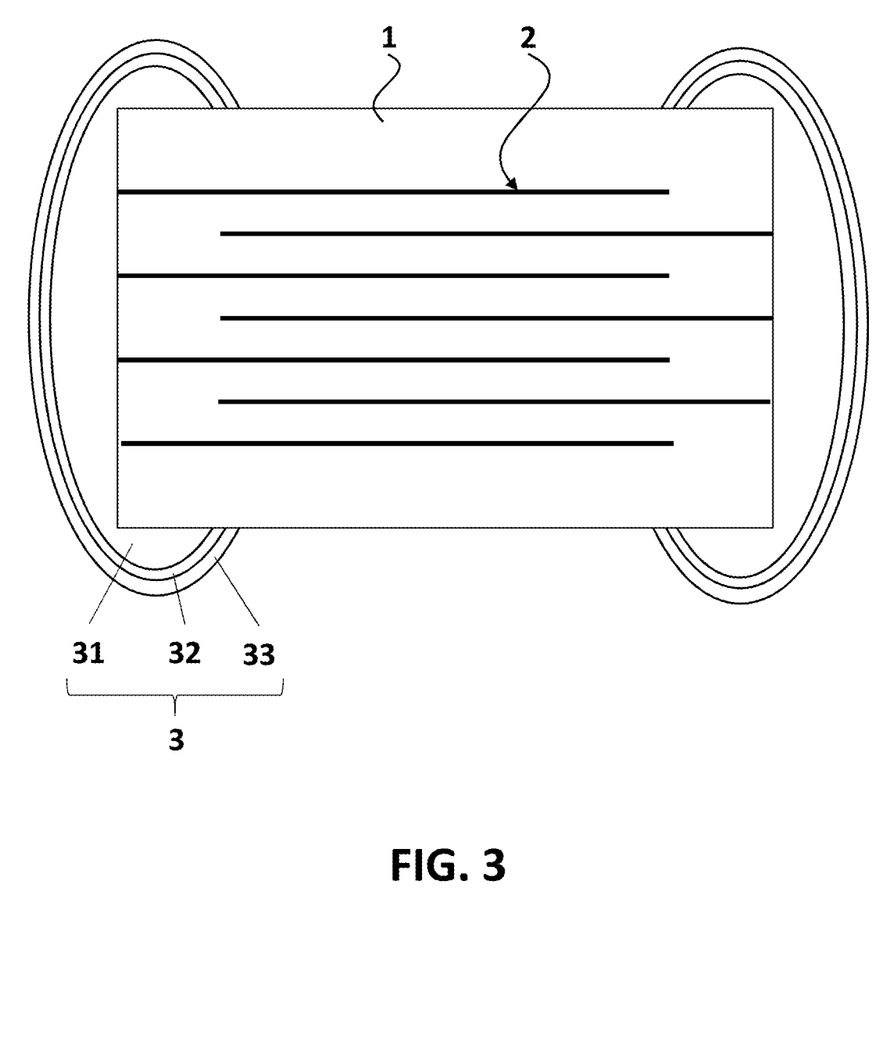
FIG. 3 is a schematic figure showing a high frequency ceramic capacitor of the present invention.

With reference to FIG. 3, the fourth embodiment of the present invention provides a high frequency ceramic capacitor comprising a dielectric layer (1), an internal electrode (2), and two terminal electrodes (3). The high frequency ceramic capacitor has low tight tolerance on capacitance value and low equivalent series resistance.

The dielectric layer (1) comprises the low-temperature co-fired microwave dielectric ceramic material as the embodiment above. The internal electrode (2) is positioned on a surface of the dielectric layer (1), and is made of silver, palladium, nickel, or copper. The terminal electrodes (3) are respectively mounted at two sides of the dielectric layer, and each is made of silver, nickel, copper, or tin. In addition, each terminal electrode (3) comprises a substrate layer (31), a barrier layer (32), and a soldering layer (33). The substrate layer (31) is mounted at one side of the dielectric layer (1), the barrier layer (32) is mounted on the substrate layer (31), and the soldering layer (33) is mounted on the barrier layer (32).

According to the formulation in the present invention: 85 wt % to 99 wt % ceramic material is mixed with 1 wt % to 15 wt % glass material, and after mixing ceramic material in the proportion of different x, y and z with that in different glass/ceramic ingredient proportions, pressing into disk and coating Ag or Cu electrode onto the disk for co-firing, and then the physical and dielectric properties of different ceramic composites after sintering are shown in Table 1. Wherein, the quality factor is obtained by inversing the dispassion factor of sintered body that is measured through a capacitance meter at 1 MHz communication signal by way of biasing 1 Vrms; and for temperature-capacitance coefficient measurement, ΔC/C, ΔC/C is obtained by observing the capacitance variants ΔC at −55° C.-125° C. based on the device capacitance measured at room temperature of 25° C.

Experiment 1-1: with x=0.2, y=0.05, and z=0.02, ceramic material is mixed with 1 wt % glass material for co-firing test with Cu electrode at 970° C. to prepare a low-temperature co-fired microwave dielectric ceramic material with density of 3.23 (g/cm$^3$); quality factor (Q) point of 6250; dielectric constant and capacitance-temperature coefficient of 8.5 and −14 ppm/° C. respectively; insulation resistance of 5.2×10$^{12}$Ω.

Experiment 1-2: when x=0.2, y=0.05, z=0.02, ceramic material is mixed with 1 wt % glass material for co-firing test with Ag electrode at 915° C. to prepare a low-temperature co-fired microwave dielectric ceramic material with density of 3.17 (g/cm$^3$); quality factor (Q) of 5882; dielectric constant and capacitance-temperature coefficient of 8.1 and −15 ppm/° C. respectively; insulation resistance of 4.2×10$^{12}$Ω.

Experiment 1-3: when x=0.2, y=0.1, z=0.05, ceramic material is mixed with 5 wt % glass material for co-firing test with Cu electrode at 970° C. to prepare a low-temperature co-fired microwave dielectric ceramic material with density of 3.28 (g/cm$^3$); quality factor (Q) of 6666; dielectric constant and capacitance-temperature coefficient of 9.6 and 18 ppm/° C. respectively; insulation resistance of 5.4×10$^{12}$Ω.

Experiment 1-4: when x=0.2, y=0.1, z=0.05, ceramic material is mixed with 5 wt % glass material for co-firing test with Ag electrode at 910° C. to prepare a low-temperature co-fired microwave dielectric ceramic material with density of 3.22 (g/cm$^3$); quality factor (Q) point of 6250; dielectric constant and capacitance-temperature coefficient of 9.5 and 19 ppm/° C. respectively; insulation resistance of 4.4×10$^{12}$Ω.

Experiment 1-5: when x=0.2, y=0.2, z=0.1, ceramic material is mixed with 10 wt % glass material for co-firing test with Cu electrode at 970° C. to prepare a low-temperature co-fired microwave dielectric ceramic material with density of 3.35 (g/cm$^3$); quality factor (Q) of 4762; dielectric constant and capacitance-temperature coefficient of 11.8 and 46 ppm/° C., respectively; insulation resistance of 3.9×10$^{12}$Ω.

Experiment 1-6: when x=0.2, y=0.2, z=0.1, ceramic material is mixed with 10 wt % Li$_2$O—BaO—SrO—CaO—B$_2$O$_3$—SiO$_2$ glass material for co-firing test with Ag electrode at 905° C. to prepare a low-temperature co-fired microwave dielectric ceramic material with density of 3.32 (g/cm$^3$); quality factor (Q) of 4545; dielectric constant and capacitance-temperature coefficient of 11.9 and 37 ppm/° C., respectively; insulation resistance of 3.5×10$^{12}$Ω.

Experiment 1-7: when x=0.2, y=0.3, z=0.15, ceramic material is mixed with 15 wt % glass material for co-firing test with Cu electrode at 970° C. to prepare a low-temperature co-fired microwave dielectric ceramic material with density of 3.34 (g/cm$^3$); quality factor (Q) of 4347; dielectric constant and capacitance-temperature coefficient of 11.9 and 47 ppm/° C. respectively; insulation resistance of 3.7×10$^{12}$Ω.

Experiment 1-8: when x=0.2, y=0.3, z=0.15, ceramic material is mixed with 15 wt % glass material for co-firing test with Ag electrode at 900° C. to prepare a low-temperature co-fired microwave dielectric ceramic material with density of 3.31 (g/cm$^3$); quality factor (Q) point of 4167; dielectric constant and capacitance-temperature coefficient of 12 and 40 ppm/° C. respectively; insulation resistance property of 3.8×10$^{12}$Ω.

Experiment 2-1: when x=0.4, y=0.05, z=0.02, ceramic material is mixed with 1 wt % glass material for co-firing test with Cu electrode at 970° C. to prepare a low-temperature co-fired microwave dielectric ceramic material with density of 3.25 (g/cm$^3$); quality factor (Q) of 5263; dielectric constant and capacitance-temperature coefficient of 8.4 and −17 ppm/° C. respectively; insulation resistance property of 4.9×10$^{12}$Ω.

Experiment 2-2: when x=0.4, y=0.05, z=0.02, ceramic material is mixed with 1 wt % glass material for co-firing test with Ag electrode at 915° C. to prepare a low-temperature co-fired microwave dielectric ceramic material with density of 3.21 (g/cm$^3$); quality factor (Q) point of 5000; dielectric constant and capacitance-temperature coefficient of 8.1 and −15 ppm/° C. respectively; insulation resistance property of 4.3×10$^{12}$Ω.

Experiment 2-3: when x=0.4, y=0.1, z=0.05, ceramic material is mixed with 5 wt % glass material for co-firing test with Cu electrode at 970° C. to prepare a low-temperature co-fired microwave dielectric ceramic material with density of 3.30 (g/cm$^3$); quality factor (Q) of 5555; dielectric constant and capacitance-temperature coefficient of 11.7 and 17 ppm/° C. respectively; insulation resistance property of 5.6×10$^{12}$Ω.

Experiment 2-4: when x=0.4, y=0.1, z=0.05, ceramic material is mixed with 5 wt % glass material for co-firing test with Ag electrode at 910° C. to prepare a low-temperature co-fired microwave dielectric ceramic material with density of 3.25 (g/cm$^3$); quality factor (Q) point of 5263; dielectric constant and capacitance-temperature coefficient of 11.6 and 18 ppm/° C. respectively; insulation resistance of 4.7×10$^{12}$Ω.

Experiment 2-5: when x=0.4, y=0.2, z=0.1, ceramic material is mixed with 10 wt % glass material for co-firing test with Cu electrode at 970° C. to prepare a low-temperature co-fired microwave dielectric ceramic material with sintering density distribution of 3.38 (g/cm$^3$); quality factor (Q) point of 4545; dielectric constant and capacitance-temperature coefficient of 11.8 and 46 ppm/° C. respectively; insulation resistance property of 4.8×10$^{12}$Ω.

Experiment 2-6: when x=0.4, y=0.2, z=0.1, ceramic material is mixed with 10 wt % glass material for co-firing test with Ag electrode at 905° C. to prepare a low-temperature co-fired microwave dielectric ceramic material with density of 3.42 (g/cm$^3$); quality factor (Q) of 4347; dielectric constant and capacitance-temperature coefficient of 11.6 and 44 ppm/° C. respectively; insulation resistance property of 3.9×10$^{12}$Ω.

Experiment 2-7: when x=0.4, y=0.3, z=0.15, ceramic material is mixed with 15 wt % glass material for co-firing test with Cu electrode at 970° C. to prepare a low-temperature co-fired microwave dielectric ceramic material with density of 3.37 (g/cm$^3$); quality factor (Q) point of 3846; dielectric constant and capacitance-temperature coefficient of 14.2 and 47 ppm/° C. respectively; insulation resistance property of 4.4×10$^{12}$Ω.

Experiment 2-8: when x=0.4, y=0.3, z=0.15, ceramic material is mixed with 15 wt % glass material for co-firing test with Ag electrode at 900° C. to prepare a low-temperature co-fired microwave dielectric ceramic material with density of 3.40 (g/cm$^3$); quality factor (Q) of 3704; dielectric constant and capacitance-temperature coefficient of 14 and 46 ppm/° C. respectively; insulation resistance of 3.9×10$^{12}$Ω.

Experiment 3-1: when x=0.5, y=0.05, z=0.02, ceramic material is mixed with 1 wt % glass material for co-firing test with Cu electrode at 970° C. to prepare a low-temperature co-fired microwave dielectric ceramic material with density of 3.28 (g/cm$^3$); quality factor (Q) point of 4545; dielectric constant and capacitance-temperature coefficient of 8.5 and −17 ppm/° C. respectively; insulation resistance of 5.3×10$^{12}$Ω.

Experiment 3-2: when x=0.5, y=0.05, z=0.02, ceramic material is mixed with 1 wt % glass material for co-firing test with Ag electrode at 915° C. to prepare a low-temperature co-fired microwave dielectric ceramic material with density of 3.25 (g/cm$^3$); quality factor (Q) point of 4347; dielectric constant and capacitance-temperature coefficient of 8.2 and −19 ppm/° C. respectively; insulation resistance of 4.3×10$^{12}$Ω.

Experiment 3-3: when x=0.5, y=0.1, z=0.05, ceramic material is mixed with 5 wt % glass material for co-firing test with Cu electrode at 970° C. to prepare a low-temperature co-fired microwave dielectric ceramic material with density of 3.36 (g/cm$^3$); quality factor (Q) of 4762; dielectric constant and capacitance-temperature coefficient of 9.6 and 15 ppm/° C. respectively; insulation resistance property of 5.7×10$^{12}$Ω.

Experiment 3-4: when x=0.5, y=0.1, z=0.05, ceramic material is mixed with 5 wt % glass material for co-firing test with Ag electrode at 910° C. to prepare a low-temperature co-fired microwave dielectric ceramic material with sintering density distribution of 3.32 (g/cm$^3$); quality factor (Q) point of 4545; dielectric constant and capacitance-temperature coefficient of 9.5 and 14 ppm/° C. respectively; insulation resistance property of 5.2×10$^{12}$Ω.

Experiment 3-5: when x=0.5, y=0.2, z=0.1, ceramic material is mixed with 10 wt % glass material for co-firing test with Cu electrode at 970° C. to prepare a low-temperature co-fired microwave dielectric ceramic material with sintering density distribution of 3.45 (g/cm$^3$); quality factor (Q) of 3846; dielectric constant and capacitance-temperature coefficient of 11.8 and 45 ppm/° C. respectively; insulation resistance of 4.9×10$^{12}$Ω.

Experiment 3-6: when x=0.5, y=0.2, z=0.1, ceramic material is mixed with 10 wt % glass material for co-firing test with Ag electrode at 905° C. to prepare a low-temperature co-fired microwave dielectric ceramic material with sintering density distribution of 3.41 (g/cm$^3$); quality factor (Q) of 3571; dielectric constant and capacitance-temperature coefficient of 11.7 and 45 ppm/° C. respectively; insulation resistance of 3.9×10$^{12}$Ω.

Experiment 3-7: when x=0.5, y=0.3, z=0.15, ceramic material is mixed with 15 wt % glass material for co-firing test with Cu electrode at 970° C. to prepare a low-temperature co-fired microwave dielectric ceramic material with density of 3.44 (g/cm$^3$); quality factor (Q) point of 3704; dielectric constant and capacitance-temperature coefficient of 11.9 and 46 ppm/° C. respectively; insulation resistance of 4.4×10$^{12}$Ω.

Experiment 3-8: when x=0.5, y=0.3, z=0.15, ceramic material is mixed with 15 wt % glass material for co-firing test with Ag electrode at 900° C. to prepare a low-temperature co-fired microwave dielectric ceramic material with density of 3.42 (g/cm$^3$); quality factor (Q) point of 3448; dielectric constant and capacitance-temperature coefficient of 12 and 47 ppm/° C. respectively; insulation resistance of 4.0×10$^{12}$Ω.

Experiment 4-1: when x=0.7, y=0.05, z=0.02, ceramic material is mixed with 1 wt % glass material for co-firing test with Cu electrode at 970° C. to prepare a low-temperature co-fired microwave dielectric ceramic material with density of 3.31 (g/cm$^3$); quality factor (Q) point of 4000; dielectric constant and capacitance-temperature coefficient of 8.5 and −19 ppm/° C. respectively; insulation resistance of 5.3×10$^{12}$Ω.

Experiment 4-2: when x=0.7, y=0.05, z=0.02, ceramic material is mixed with 1 wt % glass material for co-firing test with Ag electrode at 915° C. to prepare a low-temperature co-fired microwave dielectric ceramic material with density of 3.26 (g/cm$^3$); quality factor (Q) of 3846; dielectric constant and capacitance-temperature coefficient of 7.9 and −15 ppm/° C. respectively; insulation resistance of 5.1×10$^{12}$Ω.

Experiment 4-3: when x=0.7, y=0.1, z=0.05, ceramic material is mixed with 5 wt % glass material for co-firing test with Cu electrode at 970° C. to prepare a low-temperature co-fired microwave dielectric ceramic material with density of 3.41 (g/cm$^3$); quality factor (Q) point of 4167; dielectric constant and capacitance-temperature coefficient of 9.6 and 14 ppm/° C. respectively; insulation resistance of 6.7×10$^{12}$Ω.

Experiment 4-4: when x=0.7, y=0.1, z=0.05, ceramic material is mixed with 5 wt % $Li_2O$—BaO—SrO—CaO—$B_2O_3$—$SiO_2$ glass material for co-firing test with Ag electrode at 910° C. to prepare a low-temperature co-fired microwave dielectric ceramic material with density of 3.31 (g/cm$^3$); quality factor (Q) point of 4000; dielectric constant and capacitance-temperature coefficient of 9.4 and 15 ppm/° C. respectively; insulation resistance of 6.2×10$^{12}$Ω.

Experiment 4-5: when x=0.7, y=0.2, z=0.1, ceramic material is mixed with 10 wt % glass material for co-firing test with Cu electrode at 970° C. to prepare a low-temperature co-fired microwave dielectric ceramic material with density of 3.50 (g/cm$^3$); quality factor (Q) point of 3448; dielectric constant and capacitance-temperature coefficient of 11.8 and 45 ppm/° C. respectively; insulation resistance of 4.8×10$^{12}$Ω.

Experiment 4-6: when x=0.7, y=0.2, z=0.1, ceramic material is mixed with 10 wt % glass material for co-firing test with Ag electrode at 905° C. to prepare a low-temperature co-fired microwave dielectric ceramic material with density of 3.43 (g/cm$^3$); quality factor (Q) point of 3226; dielectric constant and capacitance-temperature coefficient of 11.6 and 39 ppm/° C. respectively; insulation resistance of 4.7×10$^{12}$Ω.

Experiment 4-7: when x=0.7, y=0.3, z=0.15, ceramic material is mixed with 15 wt % glass material for co-firing test with Cu electrode at 970° C. to prepare a low-temperature co-fired microwave dielectric ceramic material with density of 3.52 (g/cm$^3$); quality factor (Q) point of 3125; dielectric constant and capacitance-temperature coefficient of 11.9 and 46 ppm/° C. respectively; insulation resistance of 4.6×10$^{12}$Ω.

Experiment 4-8: when x=0.7, y=0.3, z=0.15, ceramic material is mixed with 15 wt % glass material for co-firing test with Ag electrode at 900° C. to prepare a low-temperature co-fired microwave dielectric ceramic material with density of 3.46 (g/cm$^3$); quality factor (Q) point of 2941; dielectric constant and capacitance-temperature coefficient of 11.8 and 44 ppm/° C. respectively; insulation resistance of 4.3×10$^{12}$Ω.

As shown in Table 1, the density of sintered body raises with the adding amount of glass increases and the sintering density distribution is 3.17-3.52 (g/cm$^3$); the quality factor property correlates with the adding proportion of main material with high microwave property and the density after sintering, and the quality factor distribution is 2914-6250; the dielectric constant and capacitance-temperature coefficient falls on respectively: 8.1-14.2 and −19-46 ppm/° C. In all, after being sintered with Ag or Cu, the sintered material has low dielectric constant property, and high quality factor, efficacious temperature-capacitance coefficient and high insulation resistance property (≥3.7×10$^{12}$Ω).

With reference to Table 2, results of sintering property are shown when 90 wt % ceramic material (x=0.5, y=0.2, z=0.1) is mixed with 10 wt % glass material with different formulation at 900° C. The components adding into the glass material are: Li$_2$O accounting for a wt % by weight of the glass material, 0 wt %≤a wt %≤10 wt %; BaO accounting for b wt % by weight of the glass material, 1 wt %≤b wt %≤15 wt %; SrO accounting for c wt % by weight of the glass material, 1 wt %≤c wt %≤11 wt %; CaO accounting for d wt % by weight of the glass material, 5 wt %≤d wt %≤23 wt %; B$_2$O$_3$ accounting for e wt % by weight of the glass material, 5 wt %≤e wt %≤30 wt %; SiO$_2$ accounting for f wt % by weight of the glass material, 20 wt %≤f wt %≤50 wt %, wherein a wt %+b wt %+c wt %+d wt %+e wt %+f wt %=100 wt %.

Experiment 5-1: when 90 wt % ceramic material (x indicates a ratio value of a weight of Ca$_2$SiO$_4$ relative to a sum weight of Ca$_2$SiO$_4$ and Mg$_2$SiO$_4$, x=0.5; y indicates a ratio value of a weight of CaTiO$_3$ relative to a sum weight of Mg$_2$SiO$_4$, Ca$_2$SiO$_4$, CaTiO$_3$, and CaZrO$_3$, y=0.2; z indicates a ratio value of a weight of CaZrO$_3$ relative to a sum weight of Mg$_2$SiO$_4$, Ca$_2$SiO$_4$, CaTiO$_3$, and CaZrO$_3$, z=0.1) being mixed with 10 wt % glass material with different formulation is co-fired with Cu electrode at 970° C. Wherein, the components adding into the glass material are: Li$_2$O accounting for 10 wt % by weight of the glass material; BaO accounting for 10 wt % by weight of the glass material; SrO accounting for 11 wt % by weight of the glass material; CaO accounting for 14 wt % by weight of the glass material; B$_2$O$_3$ accounting for 5 wt % by weight of the glass material; SiO$_2$ accounting for 50 wt % by weight of the glass material. The prepared low-temperature co-fired microwave dielectric ceramic material has a density of 3.45 (g/cm$^3$); quality factor (Q) point of 3846; dielectric constant and capacitance-temperature coefficient of 11.8 and 45 ppm/° C. respectively; insulation resistance of 4.9×10$^{12}$Ω.

Experiment 5-2: when 90 wt % ceramic material (x indicates a ratio value of a weight of Ca$_2$SiO$_4$ relative to a sum weight of Ca$_2$SiO$_4$ and Mg$_2$SiO$_4$, x=0.5; y indicates a ratio value of a weight of CaTiO$_3$ relative to a sum weight of Mg$_2$SiO$_4$, Ca$_2$SiO$_4$, CaTiO$_3$, and CaZrO$_3$, y=0.2; z indicates a ratio value of a weight of CaZrO$_3$ relative to a sum weight of Mg$_2$SiO$_4$, Ca$_2$SiO$_4$, CaTiO$_3$, and CaZrO$_3$, z=0.1) being mixed with 10 wt % glass material with different formulation is co-fired with Cu electrode at 935° C. Wherein, the components adding into the glass material are: Li$_2$O accounting for 9 wt % in the glass material by weight of the glass material; BaO accounting for 1 wt % by weight of the glass material; SrO accounting for 10 wt % by weight of the glass material; CaO accounting for 5 wt % by weight of the glass material; B$_2$O$_3$ accounting for 29 wt % by weight of the glass material; SiO$_2$ accounting for 46 wt % by weight of the glass material. The prepared low-temperature co-fired microwave dielectric ceramic material has a density of 3.4 (g/cm$^3$); quality factor (Q) point of 3923; dielectric constant and capacitance-temperature coefficient of 12.3 and 40 ppm/° C. respectively; insulation resistance of 5.9×10$^{12}$Ω.

Experiment 5-3: when 90 wt % ceramic material (x indicates a ratio value of a weight of Ca$_2$SiO$_4$ relative to a sum weight of Ca$_2$SiO$_4$ and Mg$_2$SiO$_4$, x=0.5; y indicates a ratio value of a weight of CaTiO$_3$ relative to a sum weight of Mg$_2$SiO$_4$, Ca$_2$SiO$_4$, CaTiO$_3$, and CaZrO$_3$, y=0.2; z indicates a ratio value of a weight of CaZrO$_3$ relative to a sum weight of Mg$_2$SiO$_4$, Ca$_2$SiO$_4$, CaTiO$_3$, and CaZrO$_3$, z=0.1) being mixed with 10 wt % glass material with different formulation is co-fired with Cu electrode at 960° C. Wherein, the components adding into the glass material are: Li$_2$O accounting for 8 wt % by weight of the glass material; BaO accounting for 10 wt % by weight of the glass material; SrO accounting for 8 wt % by weight of the glass material; CaO accounting for 19 wt % by weight of the glass material; B$_2$O$_3$ accounting for 20 wt % by weight of the glass material; SiO$_2$ accounting for 35 wt % by weight of the glass material. The prepared low-temperature co-fired microwave dielectric ceramic material has a density of 3.35 (g/cm$^3$); quality factor (Q) point of 4005; dielectric constant and capacitance-temperature coefficient of 12.6 and 35 ppm/° C. respectively; insulation resistance of 6.2×10$^{12}$Ω.

Experiment 5-4: when 90 wt % ceramic material (x indicates a ratio value of a weight of Ca$_2$SiO$_4$ relative to a sum weight of Ca$_2$SiO$_4$ and Mg$_2$SiO$_4$, x=0.5; y indicates a ratio value of a weight of CaTiO$_3$ relative to a sum weight of Mg$_2$SiO$_4$, Ca$_2$SiO$_4$, CaTiO$_3$, and CaZrO$_3$, y=0.2; z indicates a ratio value of a weight of CaZrO$_3$ relative to a sum weight of Mg$_2$SiO$_4$, Ca$_2$SiO$_4$, CaTiO$_3$, and CaZrO$_3$, z=0.1) being mixed with 10 wt % glass material with different formulation is co-fired with Cu electrode at 930° C. Wherein, the components adding into the glass material are: Li$_2$O accounting for 5 wt % by weight of the glass material; BaO accounting for 14 wt % by weight of the glass material; SrO accounting for 10 wt % by weight of the glass material; CaO accounting for 23 wt % by weight of the glass material; B$_2$O$_3$ accounting for 28 wt % by weight of the glass material; SiO$_2$ accounting for 20 wt % by weight of the glass material. The prepared low-temperature co-fired microwave dielectric ceramic material has a density of 3.38 (g/cm$^3$); quality factor (Q) of 4265; dielectric constant and capacitance-temperature coefficient of 11.8 and 37 ppm/° C. respectively; insulation resistance of 7.9×10$^{12}$Ω.

Experiment 5-5: when 90 wt % ceramic material (x indicates a ratio value of a weight of Ca$_2$SiO$_4$ relative to a sum weight of Ca$_2$SiO$_4$ and Mg$_2$SiO$_4$, x=0.5; y indicates a ratio value of a weight of $CaTiO_3$ relative to a sum weight of $Mg_2SiO_4$, $Ca_2SiO_4$, $CaTiO_3$, and $CaZrO_3$, y=0.2; z indicates a ratio value of a weight of $CaZrO_3$ relative to a sum weight of $Mg_2SiO_4$, $Ca_2SiO_4$, $CaTiO_3$, and $CaZrO_3$, z=0.1) being mixed with 10 wt % glass material with different formulation is co-fired with Cu electrode at 920° C. Wherein, the components adding into the glass material are: $Li_2O$ accounting for 0 wt % by weight of the glass material; BaO accounting for 15 wt % by weight of the glass material; SrO accounting for 1 wt % by weight of the glass material; CaO accounting for 17 wt % by weight of the glass material; $B_2O_3$ accounting for 30 wt % by weight of the glass material; $SiO_2$ accounting for 37 wt % by weight of the glass material. The prepared low-temperature co-fired microwave dielectric ceramic material has a density of 3.33 (g/cm$^3$); quality factor (Q) point of 4201; dielectric constant and capacitance-temperature coefficient of 12.5 and 40 ppm/° C. respectively; insulation resistance of $3.9 \times 10^{12} \Omega$.

Figure 4:
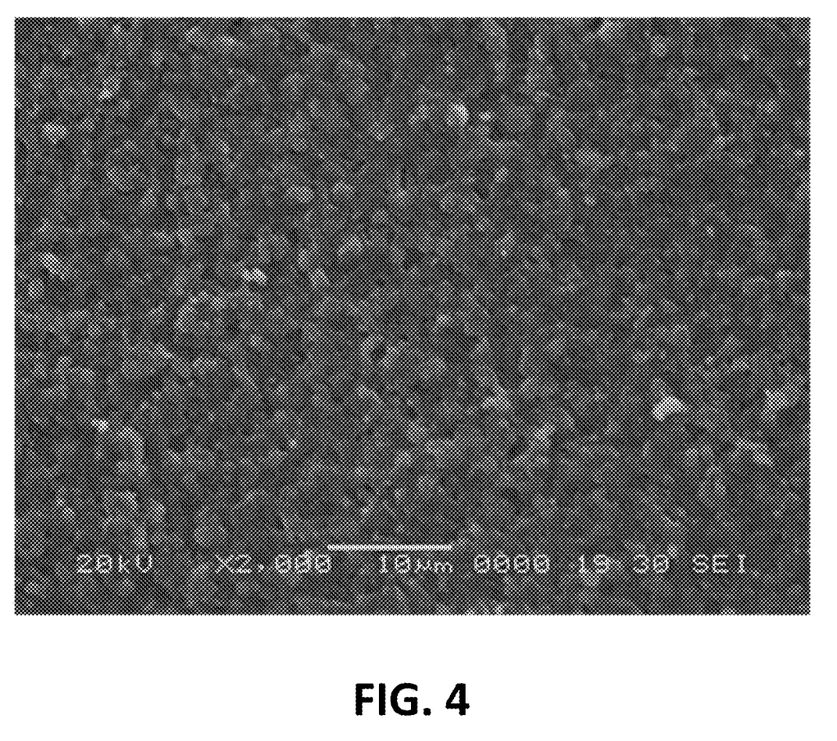
FIG. 4 is the surface morphology of the low-temperature co-fired microwave dielectric ceramic material adding with glass material after electroplating.

As shown in Table 2, the quality factor is in the range from 3846 to 4065; the dielectric constant and capacitance-temperature coefficient ranges from 11.8 to 12.5 and from 35 to 45 ppm/° C., respectively. In all, after being sintered with Cu, the sintered material has low dielectric constant and efficacious temperature-capacitance coefficient and insulation resistance property ($\geq 3.7 \times 10^{12} \Omega$). The ceramic slip prepared by alcohol with toluene and polyvinyl butyral (PVB) was a stable slip did not react with PVB and thus the gel effect did not occur, the slip viscosity being 350-450 cps; and the ceramic body made through sintering has a good anti-corrosion properties in plating solution, which has pH value less than 3. FIG. 4 shows a surface morphology of the microwave dielectric material after electroplating, which has no pinhole on the surface.

Experiment 6: a low-temperature co-fired microwave dielectric ceramic material is provided, which has dielectric constant coefficient of 9.6 and quality factor (Q) point of 6666 and comprises 95 wt % ceramic material (x indicates a ratio value of a weight of $Ca_2SiO_4$ relative to a sum weight of $Ca_2SiO_4$ and $Mg_2SiO_4$, x=0.2; y indicates a ratio value of a weight of $CaTiO_3$ relative to a sum weight of $Mg_2SiO_4$, $Ca_2SiO_4$, $CaTiO_3$, and $CaZrO_3$, y=0.1; z indicates a ratio value of a weight of $CaZrO_3$ relative to a sum weight of $Mg_2SiO_4$, $Ca_2SiO_4$, $CaTiO_3$, and $CaZrO_3$, z=0.05) and 5 wt % glass material. Then, the dielectric ceramic material is mixed with ethanol, toluene, a dispersant, and a binder by ball milling technique to form a ceramic slip. After the slip is casted into foils, internal Cu electrode paste is printed on each foil in a thickness of 2.0-3.5 μm. After which, the foils are stacked, laminated, and cut to form a lamination. The binder is burnt out from the lamination at 150-450° C., and then the lamination is sintered at 970° C. under a $N_2$ atmosphere. After the tumbling process, terminal electrodes are pasted on the sintered lamination by termination dipping technique, and cured under a $N_2$ atmosphere. A Ni layer (thickness of 2 μm) and a Sn layer (thickness of 4-6 μm) are sequentially plated on each terminal electrode so that 0201 capacitors with various capacitances of 0.1±0.02-1.0±0.02 pF are produced. As shown in Table 3, as compared with the commercial product AVX Accu-P® 0201 Thin-Film RF/Microwave Capacitor, the 0201 capacitors obtained in the experiment have lower equivalent series resistance, and exhibit low energy consumption, especially at high frequency (2 GHz).

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

TABLE 1

Results of sintering property are shown when (100-m)wt % ceramic material is mixed with (m)wt % glass material with different formulation at 900° C. (CS: $Ca_2SiO_4$; MS: $Mg_2SiO_4$, CT: $CaTiO_3$, CZ: $CaZrO_3$; x: a ratio value of a weight of $Ca_2SiO_4$ relative to a sum weight of $Ca_2SiO_4$ and $Mg_2SiO_4$; y: a ratio value of a weight of $CaTiO_3$ relative to a sum weight of $Mg_2SiO_4$, $Ca_2SiO_4$, $CaTiO_3$, and $CaZrO_3$; z: a ratio value of a weight of $CaZrO_3$ relative to a sum weight of $Mg_2SiO_4$, $Ca_2SiO_4$, $CaTiO_3$, and $CaZrO_3$)

| Item | Ceramic material (1-m wt %) | x value (CS) | 1-x value (MS) | y value (CT) | z value (CZ) | Glass material (m wt %) | Sintering temperature (° C.) | co-firing metal | density (g/cm$^3$) | Dielectric constant | Qality factor (Q) | Temperature-capacitance coefficient (ppm/° C.) | Insulation resistance ($\Omega$) |
|---|---|---|---|---|---|---|---|---|---|---|---|---|---|
| Test 1-1 | 99 | 0.2 | 0.8 | 0.05 | 0.02 | 1 | 970 | Cu | 3.23 | 8.5 | 6,250 | −14 | 5.2*10$^{12}$ |
| Test 1-2 |  |  |  |  |  |  | 915 | Ag | 3.17 | 8.1 | 5,882 | −15 | 4.2*10$^{12}$ |
| Test 1-3 | 95 |  |  | 0.1 | 0.05 | 5 | 970 | Cu | 3.28 | 9.6 | 6,666 | 18 | 5.4*10$^{12}$ |
| Test 1-4 |  |  |  |  |  |  | 910 | Ag | 3.22 | 9.5 | 6,250 | 19 | 4.4*10$^{12}$ |
| Test 1-5 | 90 |  |  | 0.2 | 0.1 | 10 | 970 | Cu | 3.35 | 11.8 | 4,762 | 46 | 3.9*10$^{12}$ |
| Test 1-6 |  |  |  |  |  |  | 905 | Ag | 3.32 | 11.9 | 4,545 | 37 | 3.5*10$^{12}$ |
| Test 1-7 | 85 |  |  | 0.3 | 0.15 | 15 | 970 | Cu | 3.34 | 11.9 | 4,347 | 47 | 3.7*10$^{12}$ |
| Test 1-8 |  |  |  |  |  |  | 900 | Ag | 3.31 | 12 | 4,167 | 40 | 3.8*10$^{12}$ |
| Test 2-1 | 99 | 0.4 | 0.6 | 0.05 | 0.02 | 1 | 970 | Cu | 3.25 | 8.4 | 5,263 | −17 | 4.9*10$^{12}$ |
| Test 2-2 |  |  |  |  |  |  | 915 | Ag | 3.21 | 8.1 | 5,000 | −15 | 4.3*10$^{12}$ |
| Test 2-3 | 95 |  |  | 0.1 | 0.05 | 5 | 970 | Cu | 3.30 | 11.7 | 5,555 | 17 | 5.6*10$^{12}$ |
| Test 2-4 |  |  |  |  |  |  | 910 | Ag | 3.25 | 11.6 | 5,263 | 18 | 4.7*10$^{12}$ |
| Test 2-5 | 90 |  |  | 0.2 | 0.1 | 10 | 970 | Cu | 3.38 | 11.8 | 4,545 | 46 | 4.8*10$^{12}$ |
| Test 2-6 |  |  |  |  |  |  | 905 | Ag | 3.42 | 11.6 | 4,347 | 44 | 3.9*10$^{12}$ |
| Test 2-7 | 85 |  |  | 0.3 | 0.15 | 15 | 970 | Cu | 3.37 | 14.2 | 3,846 | 47 | 4.4*10$^{12}$ |
| Test 2-8 |  |  |  |  |  |  | 900 | Ag | 3.40 | 14 | 3,704 | 46 | 3.9*10$^{12}$ |
| Test 3-1 | 99 | 0.5 | 0.5 | 0.05 | 0.02 | 1 | 970 | Cu | 3.28 | 8.5 | 4,545 | −17 | 5.3*10$^{12}$ |
| Test 3-2 |  |  |  |  |  |  | 915 | Ag | 3.25 | 8.2 | 4,347 | −19 | 4.3*10$^{12}$ |
| Test 3-3 | 95 |  |  | 0.1 | 0.05 | 5 | 970 | Cu | 3.36 | 9.6 | 4,762 | 15 | 5.7*10$^{12}$ |
| Test 3-4 |  |  |  |  |  |  | 910 | Ag | 3.32 | 9.5 | 4,545 | 14 | 5.2*10$^{12}$ |
| Test 3-5 | 90 |  |  | 0.2 | 0.1 | 10 | 970 | Cu | 3.45 | 11.8 | 3,846 | 45 | 4.9*10$^{12}$ |
| Test 3-6 |  |  |  |  |  |  | 905 | Ag | 3.41 | 11.7 | 3,571 | 45 | 3.9*10$^{12}$ |

TABLE 1-continued

Results of sintering property are shown when (100-m)wt % ceramic material is mixed with (m)wt % glass material with different formulation at 900° C. (CS: $Ca_2SiO_4$; MS: $Mg_2SiO_4$, CT: $CaTiO_3$, CZ: $CaZrO_3$; x: a ratio value of a weight of $Ca_2SiO_4$ relative to a sum weight of $Ca_2SiO_4$ and $Mg_2SiO_4$; y: a ratio value of a weight of $CaTiO_3$ relative to a sum weight of $Mg_2SiO_4$, $Ca_2SiO_4$, $CaTiO_3$, and $CaZrO_3$; z: a ratio value of a weight of $CaZrO_3$ relative to a sum weight of $Mg_2SiO_4$, $Ca_2SiO_4$, $CaTiO_3$, and $CaZrO_3$)

| Item | Ceramic material (1-m wt %) | x value (CS) | 1-x value (MS) | y value (CT) | z value (CZ) | Glass material (m wt %) | Sintering temperature (° C.) | Co-firing metal | density (g/cm³) | Dielectric constant | Qality factor (Q) | Temperature-capacitance coefficient (ppm/° C.) | Insulation resistance (Ω) |
|---|---|---|---|---|---|---|---|---|---|---|---|---|---|
| Test 3-7 | 85 | | | 0.3 | 0.15 | 15 | 970 | Cu | 3.44 | 11.9 | 3,704 | 46 | 4.4*10¹² |
| Test 3-8 | | | | | | | 900 | Ag | 3.42 | 12 | 3,448 | 47 | 4.0*10¹² |
| Test 4-1 | 99 | 0.7 | 0.3 | 0.05 | 0.02 | 1 | 970 | Cu | 3.31 | 8.5 | 4,000 | −19 | 5.3*10¹² |
| Test 4-2 | | | | | | | 915 | Ag | 3.26 | 7.9 | 3,846 | −15 | 5.1*10¹² |
| Test 4-3 | 95 | | | 0.1 | 0.05 | 5 | 970 | Cu | 3.41 | 9.6 | 4,167 | 14 | 6.7*10¹² |
| Test 4-4 | | | | | | | 910 | Ag | 3.31 | 9.4 | 4,000 | 15 | 6.2*10¹² |
| Test 4-5 | 90 | | | 0.2 | 0.1 | 10 | 970 | Cu | 3.50 | 11.8 | 3,448 | 45 | 4.8*10¹² |
| Test 4-6 | | | | | | | 905 | Ag | 3.43 | 11.6 | 3,226 | 39 | 4.7*10¹² |
| Test 4-7 | 85 | | | 0.3 | 0.15 | 15 | 970 | Cu | 3.52 | 11.9 | 3,125 | 46 | 4.6*10¹² |
| Test 4-8 | | | | | | | 900 | Ag | 3.46 | 11.8 | 2,941 | 44 | 4.3*10¹² |

TABLE 2

Results of sintering property are shown when 90 wt % ceramic material (x indicates a ratio value of a weight of $Ca_2SiO_4$ relative to a sum weight of $Ca_2SiO_4$ and $Mg_2SiO_4$, x = 0.5; y indicates a ratio value of a weight of $CaTiO_3$ relative to a sum weight of $Mg_2SiO_4$, $Ca_2SiO_4$, $CaTiO_3$, and $CaZrO_3$, y = 0.2; z indicates a ratio value of a weight of $CaZrO_3$ relative to a sum weight of $Mg_2SiO_4$, $Ca_2SiO_4$, $CaTiO_3$, and $CaZrO_3$, z = 0.1) is mixed with 10 wt % glass material with different formulation at 900° C.

| | $Li_2O$ (wt %) | BaO (wt %) | SrO (wt %) | CaO (wt %) | $B_2O_3$ (wt %) | $SiO_2$ (wt %) | Slurry viscosity | Sintering temperature (° C.) | Co-firing metal | Density (g/cm³) | Dielectric constant | Quality Factor (Q) | Temperature-capacitance coefficient (ppm/° C.) | Insulation resistance (Ω) |
|---|---|---|---|---|---|---|---|---|---|---|---|---|---|---|
| Test 5-1 | 10 | 10 | 11 | 14 | 5 | 50 | 350 | 970 | Cu | 3.45 | 11.8 | 3,846 | 45 | 4.9*10¹² |
| Test 5-2 | 9 | 1 | 10 | 5 | 29 | 46 | 400 | 935 | Cu | 3.4 | 12.3 | 3,923 | 40 | 5.9*10¹² |
| Test 5-3 | 8 | 10 | 8 | 19 | 20 | 35 | 430 | 960 | Cu | 3.35 | 12.6 | 4,005 | 35 | 6.2*10¹² |
| Test 5-4 | 5 | 14 | 10 | 23 | 28 | 20 | 450 | 930 | Cu | 3.38 | 11.8 | 4,265 | 37 | 7.9*10¹² |
| Test 5-5 | 0 | 15 | 1 | 17 | 30 | 37 | 400 | 920 | Cu | 3.33 | 12.5 | 4,201 | 40 | 3.9*10¹² |

TABLE 3

Results of equivalent series resistance values are shown when the 0201 capacitors of the present invention and the commercial 0201 capacitors work under 2 GHz.

| Capacitances (pF) | Commercial capacitor | Test 6 |
|---|---|---|
| 0.1 ± 0.02 | 2.28 | 2.02 |
| 0.3 ± 0.02 | 1.55 | 0.9 |
| 0.5 ± 0.02 | 0.85 | 0.13 |
| 0.7 ± 0.02 | 0.63 | 0.08 |
| 1.0 ± 0.02 | 0.33 | 0.06 |

What is claimed is:

1. A low-temperature co-fired microwave dielectric ceramic material comprising:
   (a) 85 wt % to 99 wt % ceramic material comprising $Mg_2SiO_4$, $Ca_2SiO_4$, $CaTiO_3$, and $CaZrO_3$, wherein a weight ratio of $Mg_2SiO_4$ relative to $Ca_2SiO_4$ is of (1−x):x, a weight ratio of $CaTiO_3$ relative to $CaZrO_3$ is of y:z, and a weight ratio of entities of $Mg_2SiO_4$ and $Ca_2SiO_4$ relative to $CaTiO_3$ is of (1−y−z):y, 0.2≤x≤0.7, 0.05≤y≤0.2, 0.05≤z≤0.4; and
   (b) 1 wt % to 15 wt % glass material composed of $Li_2O$, BaO, SrO, CaO, $B_2O_3$, and $SiO_2$.

2. The low-temperature co-fired microwave dielectric ceramic material according to claim 1, wherein $Li_2O$ accounts for a wt % (5 wt %≤a wt %≤10 wt %) by weight of the glass material; BaO accounts for b wt % (1 wt %≤b wt %≤15 wt %) by weight of the glass material; SrO accounts for c wt % (1 wt %≤c wt %≤11 wt %) by weight of the glass material; CaO accounts for d wt % (5 wt %≤d wt %≤23 wt %) by weight of the glass material; $B_2O_3$ accounts for e wt % (5 wt %≤e wt %≤30 wt %) by weight of the glass material; $SiO_2$ accounts for f wt % (20 wt %≤f wt %≤50 wt %) by weight of the glass material; and a wt %+b wt %+c wt %+d wt %+e wt %+f wt %=100 wt %.

3. The low-temperature co-fired microwave dielectric ceramic material according to claim 1, wherein a dielectric constant of the low-temperature co-fired microwave dielectric ceramic material ranges from 8 to 15, a density thereof is in the range from 3.17 to 3.52 (g/cm³), a quality factor thereof ranges from 2900 to 6500, and an insulation resistance thereof is of ≥3.7×10¹²Ω.

4. A high frequency ceramic capacitor comprising:
   (a) a dielectric layer composed of the low-temperature co-fired microwave dielectric ceramic material according to claim 1;

(b) an internal electrode mounted on a surface of the dielectric layer; and (c) two terminal electrodes respectively mounted at two sides of the dielectric layer.

5. The high frequency ceramic capacitor according to claim 4, wherein $Li_2O$ accounts for a wt % (5 wt %≤a wt %≤10 wt %) by weight of the glass material; BaO accounts for b wt % (1 wt %≤b wt %≤15 wt %) by weight of the glass material; SrO accounts for c wt % (1 wt %≤c wt %≤11 wt %) by weight of the glass material; CaO accounts for d wt % (5 wt %≤d wt %≤23 wt %) by weight of the glass material; $B_2O_3$ accounts for e wt % (5 wt %≤e wt %≤30 wt %) by weight of the glass material; $SiO_2$ accounts for f wt % (20 wt %≤f wt %≤50 wt %) by weight of the glass material; and a wt %+b wt %+c wt %+d wt %+e wt %+f wt %=100 wt %.

6. The high frequency ceramic capacitor according to claim 4, wherein a dielectric constant of the low-temperature co-fired microwave dielectric ceramic material ranges from 8 to 15, a density thereof is in the range from 3.17 to 3.52 (g/cm$^3$), a quality factor thereof ranges from 2900 to 6500, and an insulation resistance thereof is of ≥$3.7 \times 10^{12}$Ω.

* * * * *